United States Patent
Sams et al.

(10) Patent No.: US 12,533,680 B1
(45) Date of Patent: Jan. 27, 2026

(54) ELECTROSTATIC FREE WATER KNOCKOUT FOR HIGH WATER CUT EMULSIONS

(71) Applicant: Cameron International Corporation, Houston, TX (US)

(72) Inventors: Gary W. Sams, Spring, TX (US); Francisco E. Vera, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 19/230,957

(22) Filed: Jun. 6, 2025

(51) Int. Cl.
*B03C 11/00* (2006.01)
*B01D 17/02* (2006.01)
*B01D 17/06* (2006.01)

(52) U.S. Cl.
CPC .......... *B03C 11/00* (2013.01); *B01D 17/0214* (2013.01); *B01D 17/06* (2013.01); *B03C 2201/02* (2013.01)

(58) Field of Classification Search
CPC ................ B01D 17/06; B03C 11/00
See application file for complete search history.

(56) References Cited

U.S. PATENT DOCUMENTS

| | | | | |
|---|---|---|---|---|
| 3,368,963 A | * | 2/1968 | Hall | C10G 32/02 |
| | | | | 204/671 |
| 3,839,176 A | * | 10/1974 | McCoy | B03C 11/00 |
| | | | | 204/570 |
| 6,136,174 A | | 10/2000 | Berry | |
| 7,163,624 B2 | | 1/2007 | Nilsen | |
| 8,591,714 B2 | | 11/2013 | Sams | |
| 9,321,055 B2 | * | 4/2016 | Akdim | B03C 3/017 |
| 10,870,592 B2 | * | 12/2020 | Hench | C02F 1/469 |

FOREIGN PATENT DOCUMENTS

SU 1005819 A * 7/1982 ............. B01D 17/06

OTHER PUBLICATIONS

Machine translation of SU1005819A of Kagan et al. (Year: 1982).*

* cited by examiner

Primary Examiner — Brian W Cohen
(74) Attorney, Agent, or Firm — Jeffrey D. Frantz

(57) ABSTRACT

Systems and methods for separating water from an oil and water mixture are provided. A free water knockout vessel includes a mechanical separation section, an electrostatic coalescence section, and a gravitational separation section. A process for separating water from an oil and water mixture includes mechanical separation of the "free" water, electrostatic coalescence of emulsified water via one or more electrode assemblies, and separation of the coalesced water.

18 Claims, 6 Drawing Sheets

ELECTROSTATIC FREE WATER KNOCKOUT FOR HIGH WATER CUT EMULSIONS

BACKGROUND

The present disclosure generally relates to pretreatment of crude oil, and more particularly to electrostatic free water knockout systems and methods for removing water from crude oil having a high water cut.

When crude oil, derived from subterranean formations, arrives at the earth's surface, it is typically in the form of a water-and-oil mixture. That is, crude oil invariably has associated water that must be separated before the oil component can be efficiently transported and refined into useful commercially acceptable products.

One technique to promote the separation of free and emulsified water uses electrostatic coalescence in a production separator (e.g., an electrostatic dehydrator or a free water knock out (FWKO) vessel). When "wet" oil is exposed to an electric field of sufficient amplitude, the free water may respond by coalescing with adjacent droplets. Once the droplets are large enough, they may separate by gravity from the oil.

However, electric fields may fail if the water cut is beyond the inversion point, which is when an emulsion mixture of water and oil shifts or inverts from a water-in-oil mixture to an oil-in-water mixture. A water-in-oil mixture has water in a dispersed phase (e.g., water droplets) in oil, where the oil is in a continuous phase such that the water-in-oil mixture can be characterized as "oil external." In contrast, an oil-in-water mixture has oil in a dispersed phase (e.g., oil droplets) in water, where the water is in a continuous phase such that the oil-in-water mixture can be characterized as "water external." Once the emulsion is water external, as described above, the electric field may become compromised and the coalescence may be severely hindered, if not, completely stopped. Unfortunately, separators, or FWKO vessels, that use electrostatic coalescence are typically designed to handle production with less than 40% water cut and, therefore, may not function properly as the water cut continues to rise year over year. As the water cut increases, the performance of the electric field may be compromised which limits the water separation. As such, new techniques that efficiently initiate and aid separation of water from crude oil are needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments herein are directed to systems and methods of separation techniques that may be used independently or combined in a single separator vessel to handle high water cut emulsions and achieve 10-20% outlet water cut during a first stage of separation.

In certain embodiments, a system comprises a separator comprising a vessel having a fluid inlet, an oil outlet, and a water outlet, wherein the fluid inlet is configured to intake an oil-water mixture. The separator also comprising an electrostatic separator section disposed in the vessel, wherein the electrostatic separator section comprises at least one electrode assembly comprising a solid plate, a perforated plate spaced apart from the solid plate, a fluid flow path between the solid and perforated plates, and an electrode disposed along the fluid flow path, wherein the electrode is configured to generate an electrostatic field to induce separation of water from the oil-water mixture.

In certain embodiments, a system comprises a separator comprising a vessel having a fluid inlet, a gas outlet, an oil outlet, and a water outlet, wherein the fluid inlet is configured to intake an oil-water mixture. The separator also comprising a centrifugal separator section disposed in the vessel and an electrostatic separator section disposed in the vessel wherein the electrostatic separator section comprises at least one electrode assembly having an electrode configured to generate an electrostatic field to induce separation of water from the oil-water mixture. The separator also comprising a gravity separator section disposed in the vessel.

In certain embodiments, a method comprising directing an oil-water mixture through a centrifugal separator section in a vessel of a separator, wherein the vessel comprises a fluid inlet to intake the water-oil mixture, a gas outlet, oil outlet, and a water outlet. The method also comprising directing the oil-water mixture through an electrostatic separator section disposed in the vessel, wherein the electrostatic separator section comprises at least one electrode assembly having an electrode configured to generate an electrostatic field to induce separation of water from the water-oil mixture. The method also comprising directing the water-oil mixture through a gravity separator section disposed in the vessel.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

Figure 1:
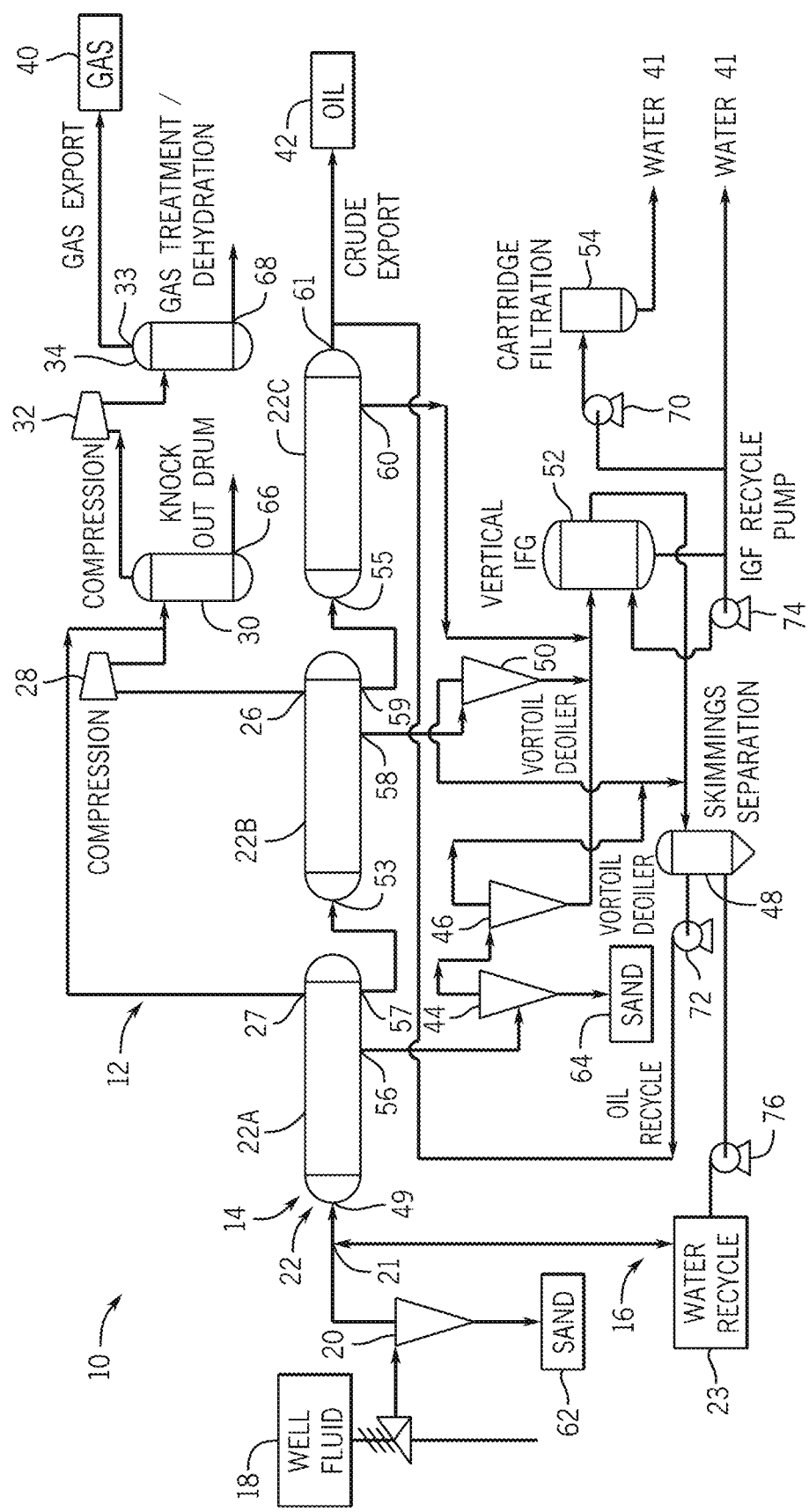
FIG. 1 illustrates a schematic example of a crude oil treatment system according to the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to describe some elements more clearly.

Energy may be derived from crude oil found in subterranean deposits and brought to the earth's surface by wells. When the crude oil reaches the earth's surface, it may be in the form of a water-and-oil mixture. That is, crude oil may be found associated with water. In order to successfully and economically transport, refine, and make use of crude oil, water may need to be separated out of the crude oil and disposed of. A free water knockout (FWKO) vessel, or separator, may be used to promote the separation of free and emulsified water. As used herein, the term "emulsified water" may refer to water that is chemically bound to the crude oil by surfactants, such as naphthenates, solids, waxes, or various chemical agents, while the term "free water" may refer to non-emulsified water contained in the oil-and-water mixture or separated out from the oil-and-water mixture. Further, as used herein, the terms "water-and-oil mixture," "oil-and-water mixture," "water-oil mixture," and "oil-water mixture" may be used interchangeably to generically refer to the mixture containing crude oil and associated water. As such, the terms "water-and-oil mixture," "oil-and-water mixture," "water-oil mixture," and "oil-water mixture" may be used to describe both water-in-oil mixtures (e.g. oil external mixture) and oil-in-water mixtures (e.g. water external mixture) alike.

During long-term production from a well, it is possible that the water production may increase and the oil production may decrease. As the water percentage grows, the separation of water from the oil becomes more problematic. In particular, at high water cuts (i.e., high water content), the water in the water-and-oil mixture may exist in three states-free water, dispersed, and emulsified water. The free water may rapidly separate from the mixture, for example, within a few minutes, provided the water droplet size is large enough to permit gravitational forces to overcome hydraulic forces imposed by the flowing crude oil. The dispersed water may be characterized as a dispersion of small droplets too small to separate within any reasonable time. The dispersed water may require additional aids to initiate coalescence, such as heat, chemicals, time, and/or voltage. The emulsified water or emulsion, in which the water is chemically bound with the oil, may also require aids to promote the resolution of the emulsion, initiate coalescence of the water, and permit separation. These aids may include, but are not limited to, heat, chemicals, time, and/or voltage. For example, electrostatics may be added to the FWKO process, which may allow for the targeting of emulsified water. In another example, spending a sufficient amount of time in the vessel, the free and emulsified water may be permitted to coalesce and separate from the produced oil. In another example, if the oil is heavy and/or has a high viscosity, the vessel may be heated to accelerate separation.

A FWKO vessel, or a separator, may be a horizontal vessel with internal components. Some separators may be designed to handle production with a lower water cut (e.g., less than 40-45% water content) and, therefore, may not function optimally when separating emulsions with a higher water cut. Furthermore, as the inlet water cut increases, for example, above around 30-40%, the intensity of the electric field of an electrostatic dehydrator may be compromised, which may limit the water separation. The present disclosure provides systems and methods for separating water from a water-and-oil mixture or emulsion having a high water cut, e.g., around the inversion point (~60% water). Processes according to the present disclosure may involve one or more processes of separation that address challenges associated with high water cut production.

With the foregoing in mind, FIG. 1 illustrates a schematic example of a crude oil treatment system 10 for processing and refining raw crude oil extracted from the ground. The treatment system 10 may include a gas processing system 12, a separator system 14, and a water processing system 16. As well fluid 18 enters the treatment system 10, it may enter into one or more wellhead desanders 20 to remove sand 62 and/or other solid particles from the well fluid 18. For example, in an embodiment, well fluid 18 may enter the wellhead desander 20 and remove sand 62 from the well fluid 18 by centrifugal separation while the de-sanded well fluid 18 continues downstream for further processing at the separator system 14.

The separator system 14 may include a plurality of separators 22 (e.g. 22A, 22B, 22C). The plurality of separators 22 may be arranged in a series or in a parallel configuration, depending on the processing requirements and design of the crude oil treatments system 10. Each separator of the plurality of separators 22 may be connected by various connections including, but not limited to, one or more pipes, manifolds, valves, pumps, or other conduits suitable for directing fluid flow between separators. Each separator of the plurality of separators 22 may be associated with a stage of separation of a plurality of stages of separation. For example, in an embodiment, a first separator 22A may be associated with a primary separation, or a first stage of separation, a second separator 22B may be associated with a second stage of separation, and a third separator 22C may be associated with a third stage of separation. Each separator of the plurality of separators 22 may be designed to withstand high, intermediate, or low pressures encountered during crude oil processing and operation. Each separator of the plurality of separators 22 may include one or more baffles, one or more coalescing plates, or other parts designed to enhance separation efficiency. The separators 22 may be made of corrosive-resistant materials that can withstand high temperatures and pressures (e.g. stainless steel or high-grade alloys).

Each separator of the plurality of separators 22 may have one or multiple sections, where each section includes various types of equipment and components to facilitate the efficient separation of oil, gas, and water. Examples of such equipment may include, but is not limited to, inlet diverters, baffles, weirs, demisting devices, coalescing plates or wires, one or more controls, piping, sand jets, pressure relief valves, temperature and/or pressure gauges, outlet nozzles, control valves, heating coils and/or external heaters, and the like. In some embodiments, a single separator may contain a single type of equipment or it may contain multiple types of equipment that facilitate multiple methods or stages of separation within the single separator. That is, a single separator may be used to perform a sequence of multiple separation steps or a plurality of separation steps. The separation steps may include one or more stages or sections of a centrifugal separator, a gravity separator, an electrostatic coalescence separator, or any combination thereof, in a series arrangement, a parallel arrangement, or a combination thereof. In the disclosed embodiments, the electrostatic coalescence separator may be used in an earlier stage of the plurality of separators 22, such as the first separator 22A, in a configuration capable of handling a high water cut. However, the electrostatic coalescence separator may be used in any one or more (e.g., all) of the plurality of separators 22. The earlier stage application of the electrostatic coalescence separator (e.g., in the first separator 22A) may be done in order to more efficiently achieve separation of high water cut emulsions with a goal to achieve between 10-20% outlet water cut. In such embodiments, each separation step of the plurality of these steps may be included in between an emulsion inlet and an oil outlet of the separator. In this way, the oil production may pass from one step or stage to the next by passing over or under baffles arranged to segment the separator into one or more sections, where each section of the one or more sections is associated with a respective stage of separation. Embodiments of multistage separation are discussed in more detail below with respect to FIG. 2.

Continuing with FIG. 1, in an embodiment, at a first stage of separation, the well fluid 18 may enter the first separator 22A via an inlet 49. The first separator may be associated with the primary separation of oil and water in which the bulk of the water (i.e. free, un-emulsified water) may be removed from the oil. Following one or more steps or processes of separation, excess water may be drained via a water outlet 21 and subsequently processed via the water processing system 16. Gas that is separated from the well fluid 18 may be released via a gas outlet 27 and subsequently processed via the gas processing system 12. The remaining oil and water mixture (i.e., the crude oil with reduced water cut) may exit the first separator 22A via an oil outlet 57, where it may continue downstream for further processing in one or more additional separators 22. For example, the separator system 14 may include a second separator 22B and a third separator 22C associated with a second and third stage of separation, respectively. As described above with respect to the first separator 22A, the second separator 22B and the third separator 22C may include respective inlets 53, 55, respective water outlets 58, 60, and respective oil outlets 59, 61. The second separator 22B may also include a gas outlet 26 similar to that of the first separator 22A. After separation, the final oil phase 42 separated from the well fluid 18 may be exported to a downstream system.

Excess water separated from the well fluid 18 may be further processed in the water processing system 16. For example, water from one or more water outlets 56, 58, 60 of the one or more separators 22 may drain to one or more additional desanders 44 to remove any remaining sand or other solid particles 64. Further, some separated water may contain remnants of oil. Therefore, excess water may be directed to one or more deoilers 46, 50 that may be configured to remove dispersed oil droplets from the excess water. The separated oil may be additionally processed in a skimming separator 48 and sent for export via one or more pumps 72. Remaining water from the one or more deoilers 46, 50 and/or the skimming separator 48 may be further processed via a vertical induced-gas flotation unit 52 configured to further separate oil and/or solids from the water. The water may be directed to recycle back into the vertical induced gas floatation unit 52 via one or more pumps 74 and/or to additional downstream processing via one or more additional pumps 70. Additionally, or alternatively, the water processing system 16 may also include a cartridge filtration unit 54 configured to filter any remaining particles or contaminants from the water via a filter. The treated water 41 may be discharged from the system 10. Additionally or alternatively, remaining water from the skimming separator 48 may be pumped via one or more pumps 76 to water recycle 23 and/or directed upstream for further processing via the separator system 14.

Continuing with FIG. 1, as described above, the crude oil treatment system 10 may include a gas treatment system 12. Gas that is released from the one or more gas outlets 24, 26 may be directed to a knock out drum 30. The knock out drum 30 may separate any remaining liquid or solids from the gas via gravitational settling and/or impingement. The knock out drum 30 may include an outlet 66 for discharge of the separated water and/or solids. The gas treatment system 12 may also include one or more compressors 28, 32 to efficiently compress and transport the gas between system steps and processes. Additionally, or alternatively, the gas treatment system 12 may include a gas treatment dehydration unit 34 (e.g., dehydration vessel or glycol dehydration unit) configured to remove excess water from the gas stream. The processed gas 40 may be released or exported via one or more gas outlets 33. The gas treatment dehydration unit 34 may also include an outlet 68 for discharge of the separated water.

Figure 2:
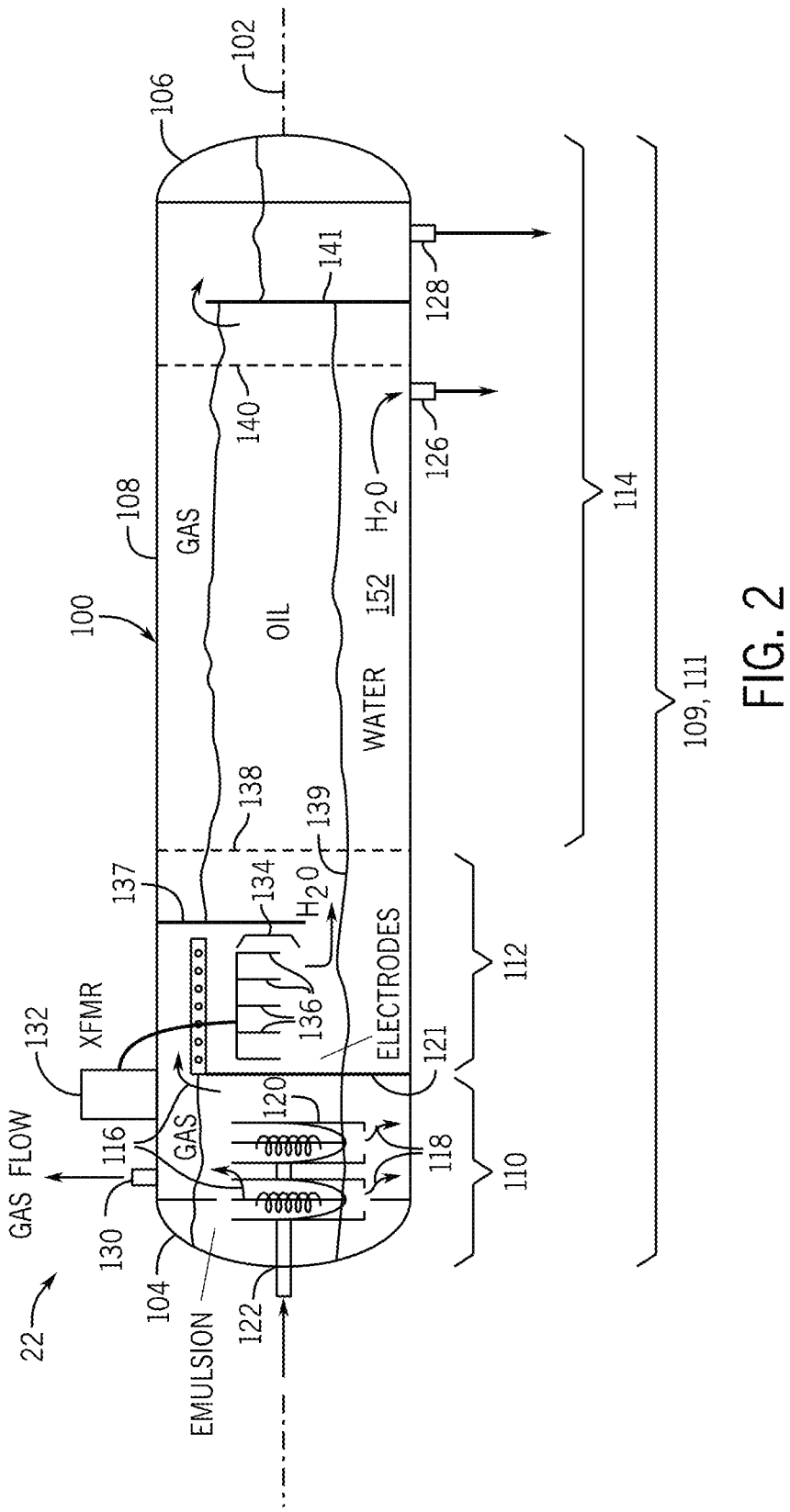
FIG. 2 illustrates a schematic example tube configuration for a separator of a free-water knock out process according to an embodiment.

FIG. 2 illustrates a schematic example multi-section tube configuration for a separator 22 configured to implement multiple free-water knock out processes according to an embodiment. The separator 22 includes a vessel 100 extending along a longitudinal axis 102 from an axial end portion 104 (e.g., end wall) to an axial end portion 106 (e.g., end wall), wherein an outer wall 108 extends circumferentially around the longitudinal axis 102 between the axial end portions 104 and 106. In the illustrated embodiment, the vessel 100 includes a plurality of separation sections or stages 109 to perform separation steps 111 in a sequence from the axial end portion 104 to the axial end portion 106. The vessel 100 includes an inlet 122 (e.g., a well fluid 18 inlet 122), a gas outlet 130, a water outlet 126, and an oil flow outlet 128. In the illustrated embodiment, the inlet 122 is along the axial end portion 104, the gas outlet 130 is disposed along an upper portion or top of the outer wall 108, and the water outlet 126 and the oil flow outlet 128 are disposed along a lower portion or bottom of the outer wall 108. In certain embodiments, the vessel 100 is a horizontal vessel having a cylindrical or rectangular cross-section. The separator 22 may include any one or more separation sections or stages 109, such as centrifugal, electrostatic, gravity, or any combination thereof, as discussed in further detail below.

Figure 3:
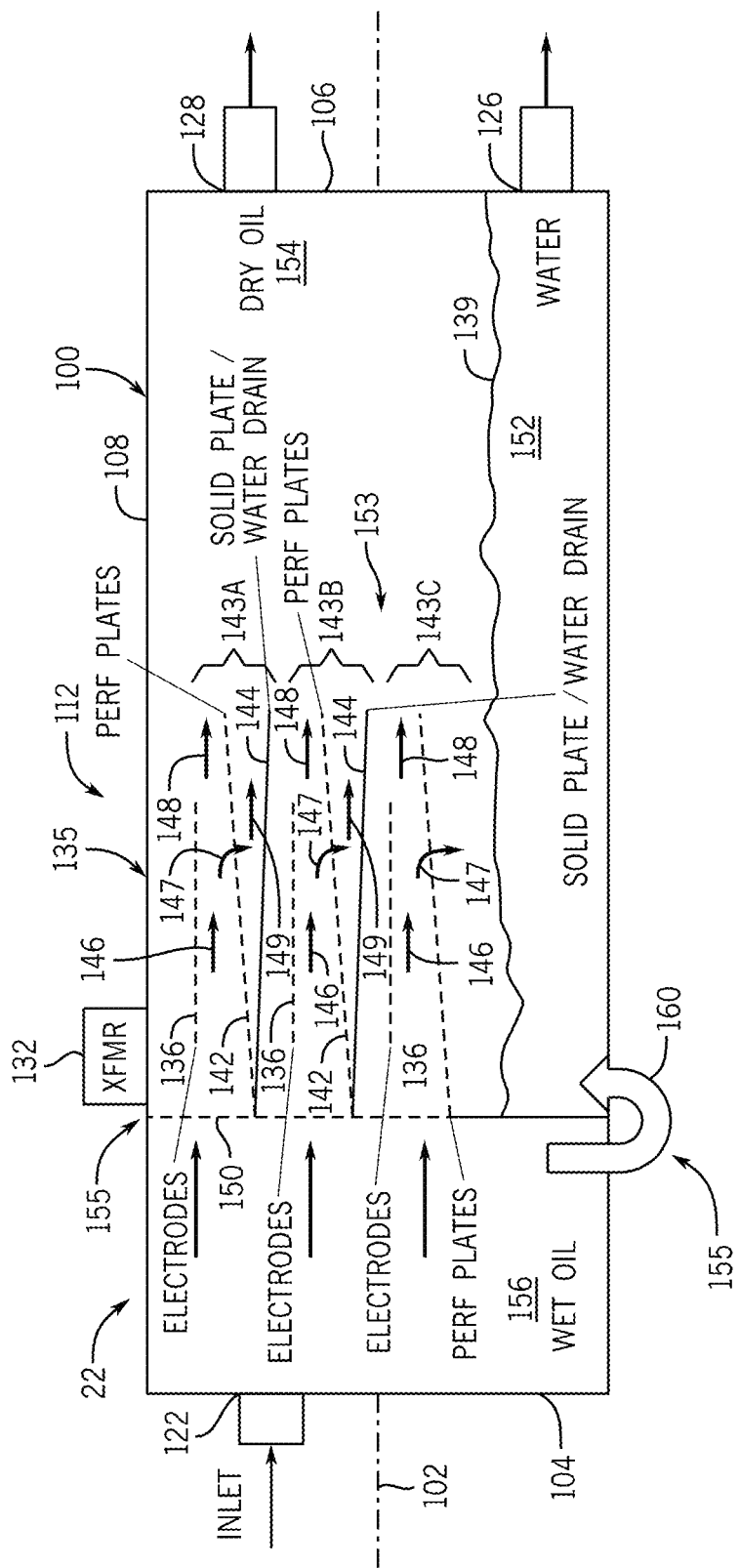
FIG. 3 illustrates a schematic example of an electrostatic separator for use in a free-water knock out process.

As previously mentioned, in some embodiments, each separator of the plurality of separators 22 may be used to implement a single step of separation. That is, in some embodiments, the systems and processes according to the present disclosure may be implemented on their own in a single horizontal vessel 100 rather than in combination, for example, as shown in FIG. 3. Alternatively, as shown in FIG. 2, a single separator 22 may have multiple sections 109 for implementing more than one process of separation 111, such that the well fluid 18 passes from one separation step to the next by passing over or under one or more baffles 138, 140 arranged to segment the separator into sections 109, where each section is contained between the separator inlet and the separator outlet. For example, as shown in FIG. 2, a single separator may include multiple separation sections or stages 109 to perform separation steps 111, where each section may correspond to a different step of separation, and where each step may be performed in each respective section. It should be noted, although not shown, each step of separation may be used individually (i.e., not in combination).

In certain embodiments, the separator 22 includes an inlet separator 110 (e.g., cyclone/centrifugal separation section or stage), an electrostatic separator 112 (e.g., electrostatic separation section or stage, and a gravity separator 114 (e.g., gravity separation section or stage) as different separation sections or stages 109. In the illustrated embodiment, the inlet separator 110 may be a first section or stage configured to perform cyclonic/centrifugal separation, mechanical separation, momentum absorption, or a combination thereof as a initial separation step 111. The electrostatic separator 112 may be a second section or stage configured to perform electrostatic separation as a separation step 111, and the gravity separator 114 may be a third section or stage configured to perform gravity separation as a separation step 111. Each of the inlet separator 110, the electrostatic separator 112, and the gravity separator 114 may include one or more separators in series and/or parallel within the respective section. In some embodiments, the separation stages 109 and the separation steps 111 may be arranged in a different order. In some cases, enhanced or mechanical separation may be omitted, thereby simplifying the separator 22 into fewer separation steps. For example, in some instances, crude oil treatment may not produce a significant amount of gas and may, therefore, not include the inlet separator 110. In that case, the separator 22 may instead include a first step of separation with the electrostatic separator 112 followed by a second step with the gravity separator 114. In another example, crude oil treatment of light oils with a lower viscosity may effectively operate with a lesser period of residence time (e.g., in some cases a few seconds) as compared with heavy oils with a higher viscosity to achieve significant water and gas removal. As such, in certain embodiments, a multi-step separator may include only two steps of separation (e.g., electrostatic separator 112 and gravity separator 114). However, as crude oils become heavier and/or increase in viscosity, the addition of a mechanical separation step via the inlet separator 110, for example, may be beneficial for efficient and enhanced separation. It should be noted that, regardless of the number of steps 111 of separation to be implemented by the separator 22, the multi-step separator may be disposed within the separator system 14 at a first stage of separation (e.g., separator 22A). For example, the separator 22 may be configured to implement multiple steps of separation for high water cut emulsions. In such cases, the well fluid 18 entering at the inlet 122 may have a high water content. Alternatively, or additionally, the multi-step embodiment may be disposed at a later stage of separation downstream of the first stage (e.g., separator 22B and/or 22C), where the water content may be lower and the concentration of oil may be higher.

In an embodiment having the inlet separator 110, as shown in FIG. 2, the separator 22 may include one or more centrifugal tubes 120 designed to achieve separation of gas from free water via a high-g centrifugal force. In certain embodiments, the tubes 120 are stationary and direct the well fluid to flow circumferentially about a central axis to impart the centrifugal force on the well fluid, thereby forcing the liquids (e.g., water, oil, etc.) to move radially outward to an inner annular surface of the tubes 120 causing separation of the liquids from the gases, and enabling the gases to flow upwardly. In certain embodiments, the inlet separator 110 may be designed with moving parts or no moving parts (e.g., stationary tubes 120). In either configuration, the gases generally flow along a low velocity central region of the centrifugal tubes 120 (e.g., along the central axis). For example, in certain embodiments, each tube 120 may have a tangential inlet and/or an internal vane assembly (e.g., an inlet cyclonic device) to induce a force of a few g's on the mixture. In some embodiments, mechanical separation may be achieved by, for example, a corrugated plate interceptor or impingement baffles in addition to, or alternatively to, the method of cyclonic separation described herein. Continuing with FIG. 2, the one or more centrifugal tubes 120 may include a gas outlet 116 configured to allow gas to exit the top of the tube 120 during separation, where it is directed towards the gas outlet 130. The tubes 120 may also include a liquid outlet 118 configured to allow the separated oil and water to exit the tube 120. The oil and gas mixture may then be directed to the electrostatic separator 112 for electrostatic separation. During separation, some free water may be forced outward by centripetal forces and settle to a lower end of the tube 120 due to gravity. As used herein, "free water" may refer to water that readily separates from the water external mixture. To accommodate for this, in some embodiments, the separator 22 may include a water drain at the section of the separator 22 having the inlet separator 110 where excess water may be drained to a lower water layer or level 152. Although shown arranged vertically in FIG. 3, the tubes 120 may be arranged horizontally or inclined at an angle ranging from vertical to horizontal for efficient bulk separation of oil and water.

In an embodiment having the electrostatic separator 112, as shown in FIG. 2, the separator 22 may include equipment and components configured to perform electrostatic coalescence (e.g., an electrostatic separation system). For example, after the inlet separator 110 reduces or removes some or most of the free water, the oil and water mixture may be oil external such that the mixture may be treated by an electrostatic field in an additional step (e.g., a second step) and/or section 109 of the FWKO vessel 22. The oil and coalesced water may flow co-currently through an electric field 134. As shown in FIG. 2, co-current flow may be accomplished by directing the mixture to flow over a weir 121 (e.g., vertical baffle or barrier wall) placed downstream of the inlet separator 110 and upstream of the electrostatic field 134, for example.

The electric field 134 of the electrostatic separator 112 (e.g., electrostatic coalescence section) may include one or more electrodes 136 coupled to one or more transformers 132. The electrodes 136 may be metallic rods or plates that may be arranged vertically, horizontally, or a combination thereof. As illustrated, the electrodes 136 may include a plurality of electrodes in a parallel spaced arrangement, thereby defining a plurality of parallel flow paths between the electrodes 136. The electrodes 136 coupled to the transformers 132 may provide the voltage to create the electric current of the electric field 134 in order to facilitate the coalescent separation of the oil and water mixture. For example, the electrodes 136 may include one or more high voltage electrodes configured to provide a high voltage electric filed to promote water droplet growth and rapid water separation. In systems and methods of the present disclosure, multiple high voltage electrodes 136 may be used to cover the cross-sectional area of the electrostatic separator 112 (e.g., electrostatic coalescence section). Various high-power equipment or components may be used such as, but not limited to, legacy AC transformers or power units, three phase AC transformers or power units, Dual Polarity, Modulated Dual Polarity, or Dual Frequency.

In certain embodiments, the electrostatic separator 112 may be the first or only step of separation in the separator 22. For example, the separator 22 may not include equipment and component to perform mechanical or cyclonic separation upstream of the electrostatic separator 112, as described above and shown in FIG. 2. Further, the separator 22 may be disposed in the system 10 as a first stage of separation, such that the separator 22 is upstream of all other separators in the system 10. In that case, when the separator 22 is positioned in the first stage of separation (e.g., separator 22A of FIG. 1), the crude oil inlet water levels may approach the inversion point (e.g., approximately 60% water). To handle the high water cut, the separator 22 may include an electrostatic separator 112 with an electrostatic assembly arranged to handle the high water cut oil at the electrostatic assembly inlet and deliver a drier oil at the electrostatic assembly outlet. That is, the electrostatic assembly may be configured to reduce water content of the flowing mixture to a level of less than or equal to approximately 10-15% regardless of the inlet water content. Specific details for an arrangement of such an electrostatic assembly of the electrostatic separator 112 are described in more detail below with respect to FIG. 3.

Continuing with FIG. 2, the separator 22 includes the gravity separator 114 as a third step of separation. In the illustrated embodiment, as shown in FIG. 2, the oil mixture may pass under a baffle 137 (e.g., vertical baffle or barrier wall) into the gravity separator 114, where larger water droplets may settle to the oil/water interface 139 such that water is below the oil/water interface 139 and oil is above the oil/water interface 139. In some embodiment, to increase or maximize the separation residence time, the mixture may pass through a first perforated plate 138 (e.g., perforated vertical baffle or barrier wall) near the entrance to the gravity separator 114 and subsequently flow to a second perforated plate 140 (e.g., perforated vertical baffle or barrier wall) disposed downstream of the first perforated plate 138 (e.g., just ahead of an exit weir 141 at the end of the separator 22). As the water and oil mixture is directed towards the second perforated plate 140, the separated water may exit the separator 22 via the water outlet 126 while the oil and gas are directed to the exit weir 141 at the end of the separator 22 where the oil may exit via the oil outlet 128.

FIG. 3 illustrates a schematic view of an embodiment of the separator 22 of FIGS. 1 and 2, further illustrating an embodiment of the electrostatic separator 112 having an electrostatic separation system 135 for use in a free-water knock out process. The separator 22 may include similar elements as those described above with respect to FIG. 2, therefore like elements are described herein with like numbers. For example, similar to the separator 22 of FIG. 2, the separator 22 of FIG. 3 may include an inlet 122, a water outlet 126, and an oil outlet 128. In addition, the separator 22 of FIG. 3 may include the electrostatic separation system 135 having one or more electrode assemblies 143. Each electrode assembly 143 may include one or more electrodes 136, one or more perforated plates 142, and one or more solid plates 144. Further, the separator 22 may include a power source or transformer 132, one or more vertical perforated, or partially perforated, baffles 150, and an equalizer pipe 160.

At the inlet 122, the oil and water mixture may flow into a wet oil section 156 of the separator 22. As described above with respect to FIG. 2, in an embodiment, the wet oil section 156 may contain equipment and components to facilitate the mechanical separation of gas from the oil and water mixture and to permit the rapid separation of free water from the mixture. For example, the wet oil section 156 may include the inlet separator 110 as discussed above with reference to FIG. 2. The water separated by the wet oil section 156 may settle to the bottom of the vessel 100 in a water layer 152. In an embodiment, as shown in FIG. 3, an equalizer pipe 160 may connect the wet oil section 156 with the downstream side of the vessel 100 to help manage the volume of water in the water layer 152. In certain embodiments, the separator 22 may include a hole in the lower part of the vertical baffle 150 permitting movement of water from the wet oil section 156 to the water outlet 126. In such an embodiment, the oil/water interface 139 may be maintained above the top of the hole to avoid the bypassing of any wet oil. In certain embodiments, the water in the wet oil section 156 may be managed with an independent interface controller coupled with a separate water discharge valve.

After the oil and water mixture has been substantially degassed and substantially all free water is separated, the mixture may be oil external such that oil is in the continuous phase and the water is in the dispersed phase (e.g. water droplets in oil). At that point, the separator 22 may direct the gas-free, oil-water mixture through the vertical baffle 150 towards the electrostatic separation system 135. The electrostatic assembly 143 may include one or more electrodes 136, one or more perforated plates 142, and one or more solid plates 144. Each electrode assembly 143 has an electrode 136 spaced between an adjacent perforated plate 142 (e.g., upper perforated plate 142 above the electrode 136) and an adjacent solid plate 144 (e.g., lower solid plate 144 below the electrode 136), thereby defining a fluid flow path 146 of the oil-water mixture along the electrode 136. In the illustrated embodiment, the electrostatic separation system 135 includes a plurality of fluid flow paths 146 along electrodes 136 between adjacent perforated and solid plates 142 and 144 arranged in a generally parallel arrangement in a horizontal direction along the longitudinal axis 102. As discussed in further detail below, the perforated and solid plates 142 and 144 may be angled toward one another along the fluid flow paths 146, thereby defining a converging geometry of the fluid flow paths 146. In operation, as the oil-water mixture flows along the electrode 136 within each fluid flow path 146, the converging geometry helps to focus the oil-water mixture along the electrode 136, thereby helping to improve electrostatic coalescence and separation of water from the oil-water mixture. As the water separates from the oil-water mixture, the separated water flows downwardly through the perforated plate 142 as indicated by arrows 147, while the oil-water mixture (or oil) continues to flow along the electrode 136 along the fluid flow path 146 until reaching the end of the perforated and solid plates 142 and 144 as indicated by arrows 148. Below the perforated plates 142, the solid plates 144 block any separated water from falling downwardly onto an electrode 136 below the solid plates 144, and instead direct the separated water to flow along the solid plates 144 until reaching the end of the solid plates 144 as indicated by arrows 149. Thus, the perforated and solid plates 142 and 144 define boundaries of the fluid flow paths 146 along the electrodes 136, thereby gradually separating water and converging the remaining oil-water mixture along the electrodes 136 to improve water oil separation in the electrostatic separation system 135. The electrodes 136 also be may centered midway between the perforated and solid plates 142 and 144, thereby helping to uniformly apply an electrostatic field onto the oil-water mixture.

The electrostatic separation system 135 may include multiple electrode assemblies 143, as shown in FIG. 3. In the example embodiment illustrated in FIG. 3, the wet oil may flow into three electrode assemblies 143. Each electrode assembly 143 may be configured to handle a portion of the production fluids (e.g., the oil and water mixture). The size or volume of each portion handled by each assembly 143 may be the same or different. For example, in an embodiment where there are three assemblies 143, each assembly 143 may be configured to handle one third of the production fluid. Dividing the flow in this way may permit the water to be managed in smaller volumes. In some embodiments, the electrostatic separation system 135 may include 1, 2, 3, 4, 5, 6, 7, 8, 9, 10, or more generally parallel horizontal arrangements of the electrode assemblies 143. Further, the porosity of upstream perforated plates 142 may be varied as needed to manage the fluid flow into each assembly 143.

Each electrode assembly 143 may include a solid plate 144 (e.g., an upper solid baffle) sloped downward from an end closest to the inlet 122 towards an end closest to an outlet 126, 128. In an example arrangement of each component, one or more electrodes 136 may be disposed above and/or below the solid plate 144 at a selected distance. The one or more electrodes 136 may be oriented horizontally. The electrodes 136 may be energized by one or more high voltage power units or transformer 132 with a voltage, for example, ranging from 5 kV to 40 kV, typically 12 kV to 20 kV. In the same example arrangement of components, below each energized electrode 136 may be a sloped perforated plate 142 (e.g., a lower perforated baffle). The sloped perforated plates 142 may slope upward from an end closest to the inlet 122 towards an end closest to an outlet 126, 128. The perforated plates 142 may be coupled to the separator 22 via one or more electrical connections. Alternatively, the perforated plates 142 may be suspended by insulators to avoid electrical connection with the separator 22.

The slope of the solid plates 144 and the perforated plates 142 may range from 2 degrees to 5 degrees, but may typically be 3 degrees to 4 degrees. The downward slope of the solid plate 144 and the upward slope of the perforated plate 142 may create a higher voltage gradient at a second end (e.g., a discharge end) 153 of the electrode separation system 135. Much of the water may be removed from the mixture before nearing the discharge end 153. As a result, the higher gradient may promote additional water coalescence by reaching smaller dispersed water droplets. In other words, the converging geometry of the fluid flow paths 146 along the electrodes 136 as defined by angles of the sloping perforated and solid plates 142 and 144 causes the electrostatic field to progressively focus on a smaller cross-sectional flow area, thereby enhancing water oil separation along the fluid flow paths 146. The angles of the sloping perforated and solid plates 142 and 144 may be measured relative to the longitudinal axis 102 of the vessel 100, which may be a centerline, horizontal axis of the vessel 100.

As illustrated in FIG. 3, wet oil may cross a vertical baffle 150 and enter a first end 155 of the electrostatic separation system 135 closest to the inlet 122. At this first end 155 closest to the inlet 122, the solid plates 144 and the perforated plates 142 of each electrode assembly 143 may be separated by the maximum distance. An electrostatic field may be created between the electrodes 136 and the solid plates 144 to promote water coalescence to speed the separation of water from the flowing oil. A similar electrostatic field may be created between the electrodes 136 and the perforated plates 142. The wide spacing at the first end 155 may form a low voltage gradient, which may tolerate higher water cut emulsions without arcing. Spacing at the first end 155 between the electrodes 136 and the solid plates 144 or perforated plates 142 may range from 5 inches to 18 inches, but may typically be between 8 inches and 12 inches. In some embodiments, in addition to the electrostatic fields between the electrodes 136 and the solid and perforated plates 142 and 144, the energized electrodes 136 may also create a low voltage gradient with the vertical baffle 150 to further initiate water coalescence. Spacing between the electrodes 136 and the vertical baffle 150 may range from 12 inches to 30 inches, but may typically be 18 inches to 24 inches.

Water coalesced by the electrostatic field may settle towards the perforated plates 142 due to gravity. In embodiments with three electrode assemblies 143, as shown in FIG. 3, and with respect to a top electrode assembly 143A and a middle electrode assembly 143B, after passing through the perforated plate 142, the water may settle on top of the solid plate 144, which may serve as the upper solid plate 144 of the electrode assembly 143 below (e.g., the upper solid plate of the middle electrode assembly 143B). Due to the downward slope of the solid plate 144, the water may then be directed to the water layer 152 at the bottom of the vessel 100 or separator 22, where it may be collected and subsequently drained via the water outlet 126. In this way, the downward slope of the solid plates 144 may facilitate water flow and permit efficient collection and drainage of the water in the water layer 152. In some embodiments, the electrostatic separation system 135 may include a duct system at the discharge end 153 of the electrode assembly 143. For example, the duct system may be configured to drain the water at a downstream end of the solid plates 144, where the water may be collected and passed via a duct to the water layer 152. Details regarding the duct system are described with regard to FIG. 4.

Some oil-water mixture may pass through to the perforated plate 142 of the below electrode assembly 143. A low voltage gradient between the perforated plate 142 and the solid plate 144 of the below electrode assembly 143 may promote some water coalescence at a lower efficiency. With respect to the lowest electrode assembly (e.g., 143C), the coalesced and separated water may be permitted to fall freely into the water layer 152. That is, the lowest electrode assembly 143 (e.g., 143C) may not include solid plate 144. By eliminating the solid plate 144 below the lowest electrode assembly 143 (e.g., 143C), the oil/water interface 139 is subject to the electrostatic field, thereby promoting additional emulsion resolution.

As described above, the electrostatic separation system 135 may be implemented in the multi-step separator 22 of FIG. 2, or it may be implemented solitarily in a first stage of separation (e.g., 22A). For example, the separator 22 may include equipment and components to perform multiple steps of separation (e.g., mechanical separation, electrostatic separation, and gravitational separation), including electrostatic separation equipment and components that are similar to those described with respect to FIG. 3. Alternatively, the separator 22 may only include equipment and components to perform electrostatic separation. In such an embodiment, the separator 22 may be disposed in the system 10, such that it is the first separator in the system 10 (e.g., the first stage of separation). Thus, the separator 22 may be disposed in the system 10 as a first stage of separation, such that the separator 22 is upstream of all other separators in the system 10. When the separator 22 is positioned in the first stage of separation (e.g., 22A of FIG. 1), the crude oil inlet water levels may approach the inversion point (e.g., approximately 60% water). To handle the high water cut, the separator 22 may include the electrostatic separation system 135, which may be configured to reduce the water content to a level of less than or equal to 10-15% regardless of the inlet water content.

Figure 4:
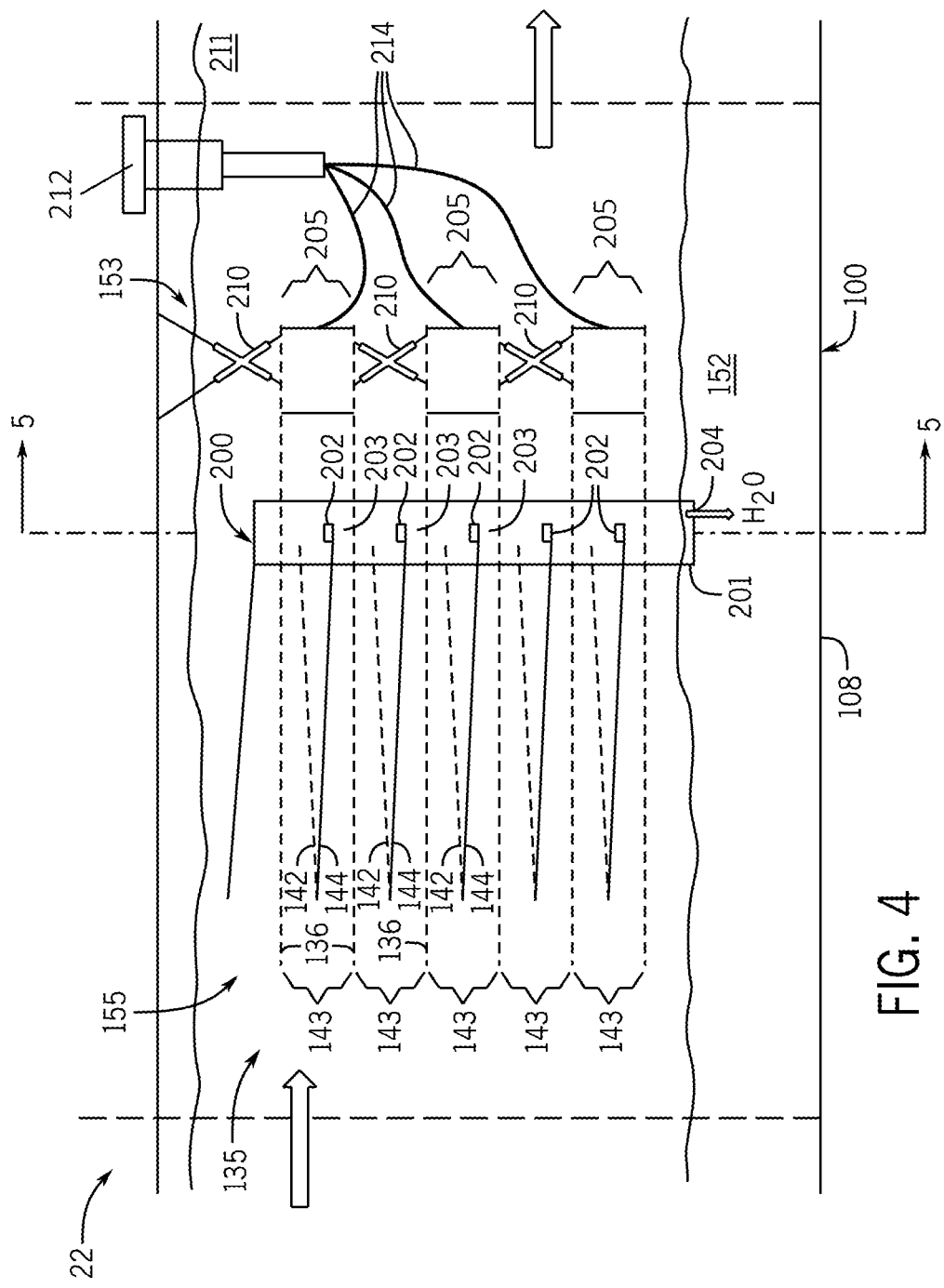
FIG. 4 illustrates a schematic of internal components of the electrostatic separator of FIG. 3.

It should be noted that more than three electrode assemblies 143 may be implemented in the electrostatic separation system 135. For example, FIG. 4 illustrates an example configuration including six electrode assemblies 143. As shown in the illustrated configuration of FIG. 4, the electrode assemblies 143 may be organized into three cells or zones 205, each of which may include two or more electrode assemblies 143. Each electrode 136 of each zone 205 may be energized by one or more power units or transformers 212 via one or more wired connections 214. The wired connections 214 may pass through a sealed connection 211 between the transformer 212 and the vessel 100. Although FIG. 4 illustrates a single transformer 212, the electrodes 136 within each zone 205 may be energized by the same transformer 212 or, in embodiments with more than one power source or transformer 212, different transformers 212. Each zone 205 may include multiple electrodes 136 (e.g., 1-3 electrodes 136), depending on the diameter of the vessel 100 of the separator 22. Further, each zone 205 may be coupled to and/or supported by one or more hangers 210, as shown in FIG. 4. The hangers 210 may include a plurality of cables, rods, arms, or a combination thereof, extending upwardly from the electrodes 136 to the outer wall 108 of the vessel 100, adjacent electrodes 136, or any combination thereof. In certain embodiments, the electrodes may be supported by a rack, vertical supports, horizontal supports, or any combination thereof. In some embodiments, the electrodes 136 may consist of the rack or the electrostatic field may be provided by the rack in lieu of individual electrodes 136. Details regarding the geometry and arrangement of the electrodes 136 are provided below with respect to FIG. 6.

As mentioned above, the separator 22 may include a vertical duct system 200 to manage the flow of separated water across the electrostatic assembly 143 to reduce possibilities for recombination with oil or low water content emulsion. For example, as illustrated in FIG. 4, the duct system 200 may include one or more vertical ducts 201 coupled to one or more horizontal ducts 202. The vertical ducts 201 may extend along opposite sides of the outer wall 108 of the vessel 100, while the horizontal ducts 202 may extend along a downstream edge 203 of the solid plates 144. The horizontal ducts 202 collect any separated water at the downstream edges 203 of the solid plates 144, and then direct the separated water to the vertical ducts 201 along the opposite sides of the outer wall 108. The separated water then flows downwardly through the vertical ducts 201 through a water outlet 204 into a bottom portion of the vessel 100 to combine with the separated water 152. The ducts 201 and 202 may be located at the dry oil end (e.g., near the discharge end 153) of the electrostatic separation system 135 at the downstream edge 203 of the solid plates 144. In certain embodiments, the horizontal ducts 202 may include a raised lip, a C-shaped channel, or a perforated tube along the downstream edge 203 of the solid plates 144. In this way, the excess coalesced water may drain through the ducts 201 and 202 to the bottom portion of the vessel 100 without contact with the electrode assemblies 143. The segmentation of the wet oil into three zones 205 with water collection and drainage in each zone may reduce the impact of water on lower sections by maintaining a stable electrostatic field and minimizing the influence created by a potential emulsion layer.

Figure 5:
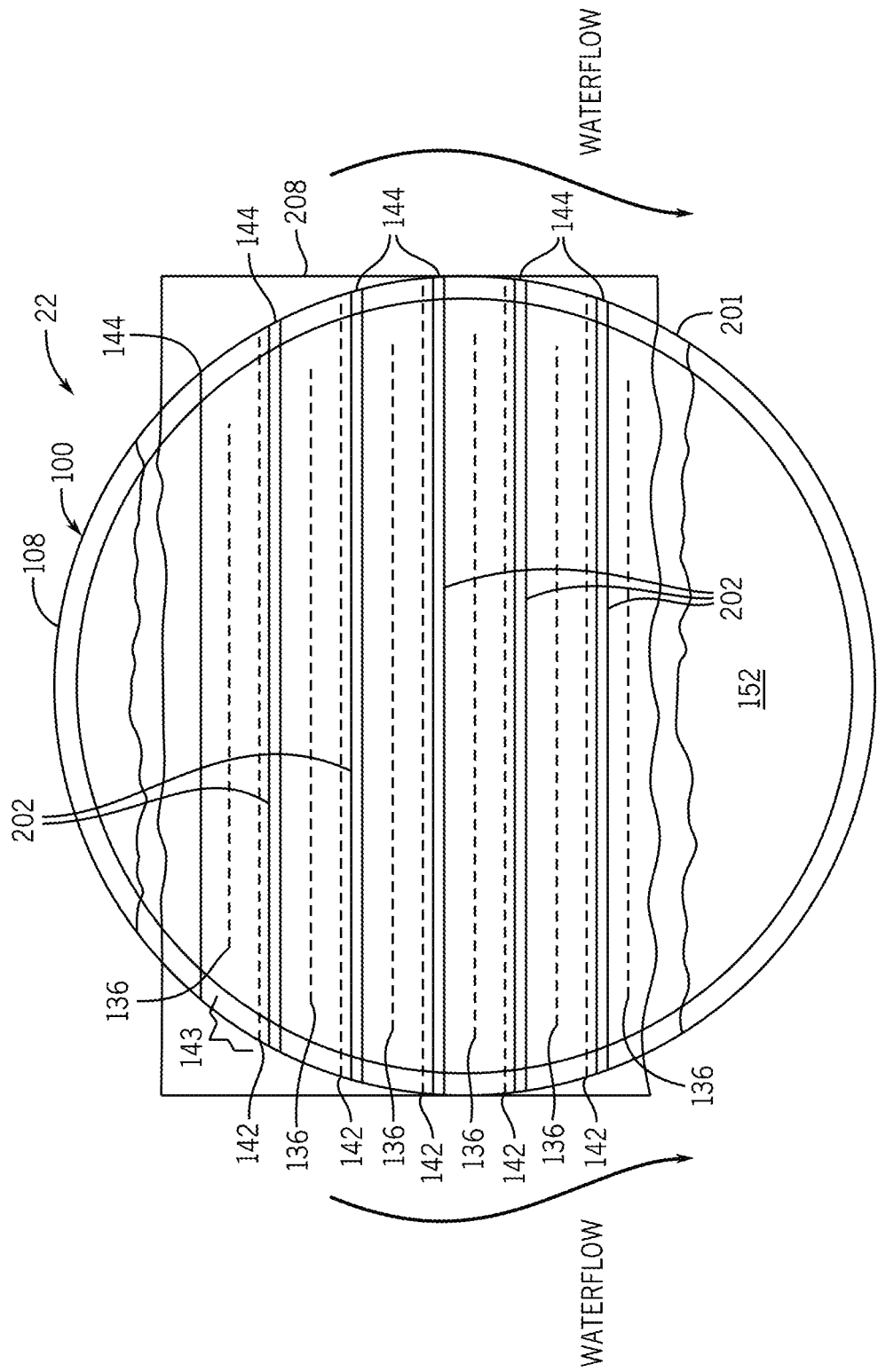
FIG. 5 illustrates an example of water flow management for the electrostatic separator of FIG. 3.

FIG. 5 is a cross-sectional view of the separator 22 taken along line 5-5 of FIG. 4, further illustrating details of the ducts 201 and 202 of the duct system 200. As shown in FIG. 5, as water is separated out via the electrode assembly 143 and falls by gravity to the solid plates 144 of the electrode assemblies 143, the separated water collected on the solid plate 144 may be directed towards the horizontal ducts 202 along the downstream edges 203 of the solid plates 144. The horizontal ducts 202 then channel the separated water to the vertical ducts 201 along the outer wall 108 (e.g., opposite side wall 208) of the separator 22. At the opposite walls 208 of the separator 22, the water may flow through the vertical ducts 201 downward towards the bottom portion of the vessel 100 having the separated water 152. In the illustrated embodiment, the outer wall 108 of the vessel 100 is annular or cylindrical, and the vertical ducts 201 curve directly along the curved inner surface of the outer wall 108 at the opposite side walls 208. In other words, the vertical ducts 201 define curved vertical ducts (e.g., C-shaped ducts).

Figure 6:
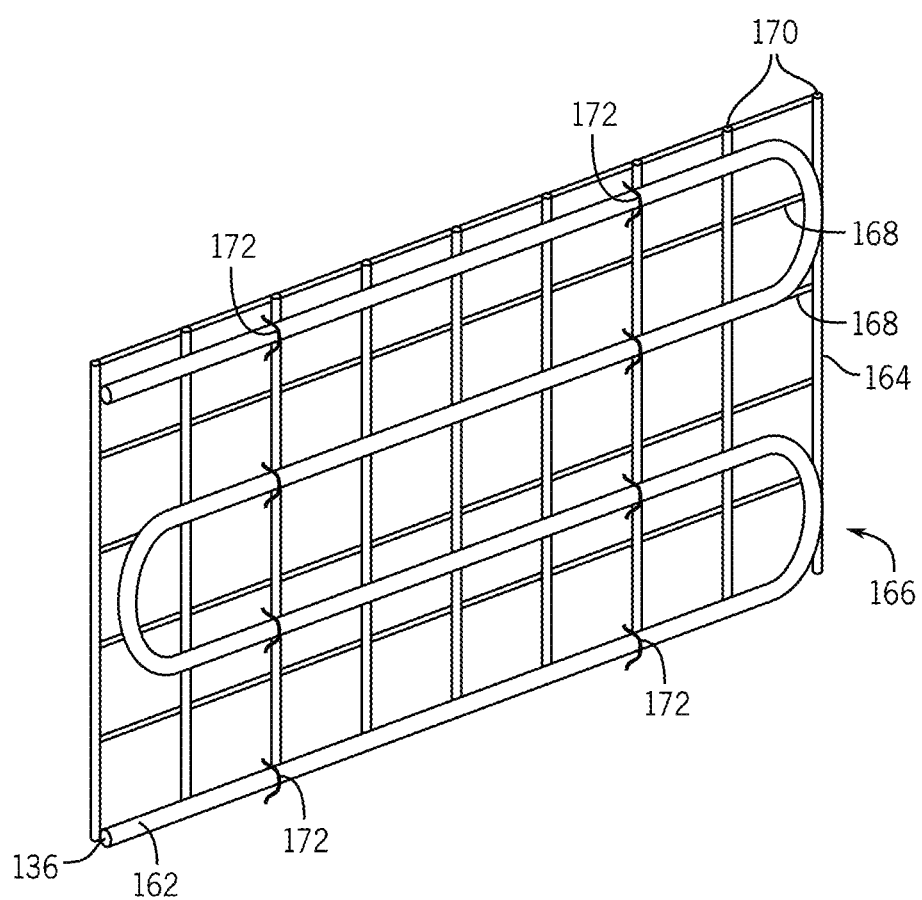
FIG. 6 illustrates a schematic of an embodiment of an electrode for use in an electrostatic separated according to an embodiment.

FIG. 6 is a perspective view of an embodiment of an electrode 136 for use in the electrode assembly 143 of the electrostatic separation system 135 of FIGS. 2-5. As described above, as the water cut increases, excessive water content may negatively impact the electrostatic separation process. For example, excess water may increase the conductivity of the mixture, thereby leading to higher current flows, which may exceed the limits of the electrostatic separator and increase the possibility of undesirable arcing. This is especially true for electrostatic separators positioned in a first stage of separation, where the water cut is the highest. In addition, an increase in conductivity in the electrostatic field may make it difficult to maintain a high voltage across the liquid phase. As such, the separated water may be proactively managed to avoid the detrimental impact created by the movement of the separated water. It should be noted, however, that although the electrostatic technology described herein is used to overcome complications of high water cut separation (e.g., primary separation), the embodiments herein may be applied in any stage of separation, including later stages of separation where water content is much lower compared to primary separation.

One way to manage the separated water is via insulation. For example, the oil phase in the separator 22 may act as an insulator for the electrical field and, when applying a high voltage, the insulation will prevent a high current. In this way, the insulation material 162 protects the electrode 136 against arcing when exposed to a high water cut mixture. However, when applied in high water cut separation, for example in primary separation, there may not be sufficient insulation. In that case, the electrode 136 itself may be insulated with one or more layers of insulation material 162. For example, insulating the electrode 136 with an insulation material 162 thick enough to assure that there will be no current between the charged electrode 136 and the ground, a high voltage may be maintained even in high water cut mixtures.

The coating, or insulation material 162, may completely or partially cover the electrode 136. Further, the insulation material 162 may be durable enough to withstand the hydrocarbons and be able to minimize the diffusion of hydrocarbons into the material 162. In addition, the insulation material 162 may be water repellent, as water diffusion into the material 162 may reduce its ability to insulate. As such, the insulation material 162 may consist of a polymer material. For example, the insulation material 162 may consist or include polyvinyl chloride (PVC), polytetrafluoroethylene (PTFE), polyethylene (PE), cross-linked polyethylene (XLPE), polyimide (PI), polyurethane (PU), silicone/silicone rubber, polycarbonate (PC), epoxy resin, or the like. In certain embodiments, the insulation material 162 may include a plurality of layers of different types insulation, such as different insulating materials, different resistances to corrosion, water, etc. For example, the insulation material may include a corrosion resistant layer, a water-resistant layer, an oil resistant layer, etc.

In certain embodiments, the insulation material 162 may be flexible in order to follow the form of the metal electrode 136. That is, the metal electrode 136 may be formed into a desired shape and/or pattern. For example, in certain embodiments, the electrode 136 may be formed into a winding pattern 166 and disposed on a wire rack or grid 164. Although the winding pattern 166 in FIG. 6 defines an "S" pattern, the electrode 136 may be formed into any patterns having a plurality of turns, curves, parallel paths, spirals, or any combination thereof. The insulation material 162 may contain the electrode 136 to form an insulated wire embodiment. The grid 164 may provide support for the electrode wire 136 and hold the electrode 136 in place. In certain embodiments, the grid 164 comprises a plurality of parallel rods 168 coupled to a plurality of parallel rods 170, wherein the parallel rods 168 and 170 are perpendicular to one another. The parallel rods 168 and 170 may be made of electrically non-conductive material, electrically conductive material, or a combination thereof. For example, the parallel rods may include insulation material over conductive rods, similar to the electrodes 136. In some embodiments, the grid 164 may be conductively coupled to the electrode 136. In that case, the electrostatic field may be created by energizing the grid 164 or by energizing the insulated wire (i.e., the electrode 136) directly. Alternatively, the electrode 136 may include the grid 164 itself. That is, in certain embodiments, rather than a winding insulated wire as shown in FIG. 6, the grid 164 may serve as the electrode 136 and may include the insulated material 162. In such an embodiment, the grid 164 may be energized directly to provide the electrostatic field. In some embodiments, the electrode 136 having the insulation material 162 may be configured to be self-supported without a separate grid 164. For example, the electrode 136 having the insulation material 162 may be sufficiently rigid to be mounted directly in the vessel 100 without the grid 164.

In certain embodiments, the electrode 136 having the insulation material 162 is an insulated electrical wire or cable, which is formed into any desired pattern (e.g., winding pattern 166) on the grid 164. For example, during assembly or construction, a technician or installer may obtain a roll of the insulated electrical wire, and then form the insulated electrical wire into any pre-defined winding pattern 166 using a template (e.g., a template of the winding pattern) or a custom winding pattern 166 depending on the particular application. In some embodiments, an installer may be provided with a single template or a plurality of templates designed for different applications, well fluids, and the like. In some embodiments, a plurality of retainers 172 may be used to mount the electrode 136 onto the grid 164. In some embodiments, the electrode 136 may be formed into the desired winding pattern 166 and subsequently coated with the insulation material 162. However, the electrode 136 with preinstalled insulation material 162 may be advantageous to create various winding patterns 166 without additional steps to add the insulation material 162.

A technical effect of the disclosed embodiments is the ability to perform separation of water from oil-water mixtures having a high water cut, particularly in the processing of well fluids. More specifically, a technical effect of the disclosed embodiments enables the use of electrostatic separators in high water cut applications, wherein electrostatic separators are typically not capable of operating. Thus, instead of using electrostatic separators only in later stage separators and/or low water cut applications, the electrostatic separators can be used in early stage separators (e.g., first stage separators) of well fluid processing systems. The disclosed embodiments direct the oil-water mixtures through a plurality of electrode assemblies having perforated and solid plates to create fluid flow paths around respective electrodes, thereby focusing the oil-water mixtures to flow in progressively smaller cross-sectional flow areas while simultaneously separating out the water. The electrodes also may be enhanced by using insulated electrical wires, which can be formed into any desired winding pattern in the electrode assemblies. In certain embodiments, the separators may further include other separator technologies in upstream and/or downstream stages, such as centrifugal separators, gravity separators, or a combination thereof.

The subject matter described in detail above may be defined by one or more clauses, as set forth below.

A system is provided that comprises a separator comprising a vessel having a fluid inlet, an oil outlet, and a water outlet, wherein the fluid inlet is configured to intake an oil-water mixture. The separator also comprising an electrostatic separator section disposed in the vessel, wherein the electrostatic separator section comprises at least one electrode assembly comprising a solid plate, a perforated plate spaced apart from the solid plate, a fluid flow path between the solid and perforated plates, and an electrode disposed along the fluid flow path, wherein the electrode is configured to generate an electrostatic field to induce separation of water from the oil-water mixture.

The system of the preceding clause, wherein the at least one electrode assembly is oriented in a horizontal orientation.

The system of any of the preceding clauses, wherein the solid plate is disposed above the electrode and the fluid flow path, and the perforated plate is disposed below the electrode and the fluid flow path.

The system of any of the preceding clauses, wherein the solid plate is angled downwardly along the fluid flow path, the perforated plate is angled upwardly along the fluid flow path, or a combination thereof.

The system of any of the preceding clauses, wherein the solid and perforated plates converge toward one another along the fluid flow path.

The system of any of the preceding clauses, wherein the solid plate is angled toward the electrode along the fluid flow path, the perforated plate is angled toward the electrode along the fluid flow path, or a combination thereof.

The system of any of the preceding clauses, wherein the electrode is centered between the solid and perforated plates.

The system of any of the preceding clauses, wherein perforated plate is configured to enable the water separated from the oil-water mixture to flow out of the fluid flow path.

The system of any of the preceding clauses, wherein the electrostatic separator section comprises a plurality of electrode assemblies each comprising the solid plate, the perforated plate, the fluid flow path, and the electrode.

The system of any of the preceding clauses, wherein the plurality of electrode assemblies is arranged in a parallel arrangement in a horizontal orientation.

The system of any of the preceding clauses, comprising a duct system configured to route the water separated from the oil-water mixture to a bottom portion of the vessel, wherein the duct system comprises a horizontal duct coupled to the solid plate of one or more of the plurality of electrode assemblies, and the duct system comprises a vertical duct coupled to the horizontal duct.

The system of any of the preceding clauses, wherein the electrostatic separator section is configured to separate the water from the oil-water mixture having a water content between 0.5 percent and 95 percent.

The system of any of the preceding clauses, wherein the electrostatic separator section is configured to separate the water from the oil-water mixture having a water content greater than or equal to 60 percent.

The system of any of the preceding clauses, wherein the separator comprises one or more additional separator sections disposed in the vessel.

The system of any of the preceding clauses, wherein the one or more additional separator sections comprise a centrifugal separator section, a gravity separator section, or a combination thereof.

The system of any of the preceding clauses, wherein the separator is a first stage separator of a plurality of separators of an oil processing facility.

A system is provided that comprises a separator comprising a vessel having a fluid inlet, a gas outlet, an oil outlet, and a water outlet, wherein the fluid inlet is configured to intake an oil-water mixture. The separator also comprising an inlet separator section disposed in the vessel and an electrostatic separator section disposed in the vessel wherein the electrostatic separator section comprising at least one electrode assembly having an electrode configured to generate an electrostatic field to induce separation of water from the oil-water mixture. The separator also comprising a gravity separator section disposed in the vessel.

The system of the preceding clause, wherein the inlet separator section is disposed upstream from the electrostatic separator section, and the gravity separator section is disposed downstream from the electrostatic separator section.

A method is provided that includes directing an oil-water mixture through an inlet separator section in a vessel of a separator, wherein the vessel comprises a fluid inlet to intake the oil-water mixture, a gas outlet, oil outlet, and a water outlet. The method also comprising directing the oil-water mixture through an electrostatic separator section disposed in the vessel, wherein the electrostatic separator comprises at least one electrode assembly having an electrode configured to generate an electrostatic field to induce separation of water from the oil-water mixture. The method also comprising directing the oil-water mixture through a gravity separator section disposed in the vessel.

The method of the preceding clause, wherein the inlet separator section is disposed upstream from the electrostatic separator section, and the gravity separator section is disposed downstream from the electrostatic separator section.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A system, comprising:
    a separator, comprising:
        a vessel having a fluid inlet, an oil outlet, and a water outlet, wherein the fluid inlet is configured to intake an oil-water mixture;
        an electrostatic separator section disposed in the vessel, wherein the electrostatic separator section comprises at least one electrode assembly comprising:
            a solid plate;
            a perforated plate spaced apart from the solid plate;
            a fluid flow path between the solid and perforated plates, and
            an electrode disposed along the fluid flow path, wherein the solid and perforated plates converge toward one another along the fluid flow path, the electrode is centered between the solid and perforated plates, and the electrode is configured to generate an electrostatic field to induce separation of water from the oil-water mixture.

2. The system of claim 1, wherein the at least one electrode assembly is oriented in a horizontal orientation.

3. The system of claim 2, wherein the solid plate is disposed above the electrode and the fluid flow path, and the perforated plate is disposed below the electrode and the fluid flow path.

4. The system of claim 3, wherein the solid plate is angled downwardly along the fluid flow path, the perforated plate is angled upwardly along the fluid flow path, or a combination thereof.

5. The system of claim 1, wherein the solid plate is angled toward the electrode along the fluid flow path, the perforated plate is angled toward the electrode along the fluid flow path, or a combination thereof.

6. The system of claim 1, wherein the perforated plate is configured to enable the water separated from the oil-water mixture to flow out of the fluid flow path.

7. The system of claim 1, wherein the electrostatic separator section comprises a plurality of electrode assemblies each comprising the solid plate, the perforated plate, the fluid flow path, and the electrode.

8. The system of claim 7, wherein the plurality of electrode assemblies is arranged in a parallel arrangement in a horizontal orientation.

9. The system of claim 7, comprising a duct system configured to route the water separated from the oil-water mixture to a bottom portion of the vessel, wherein the duct system comprises a horizontal duct coupled to the solid plate of one or more of the plurality of electrode assemblies, and the duct system comprises a vertical duct coupled to the horizontal duct.

10. The system of claim 1, wherein the electrostatic separator section is configured to separate the water from the oil-water mixture having a water content between 0.5 percent and 95 percent.

11. The system of claim 1, wherein the electrostatic separator section is configured to separate the water from the oil-water mixture having a water content greater than or equal to 60 percent.

12. The system of claim 1, wherein the separator comprises one or more additional separator sections disposed in the vessel.

13. The system of claim 12, wherein the one or more additional separator sections comprise a centrifugal separator section, a gravity separator section, or a combination thereof.

14. The system of claim 1, wherein the separator is a first stage separator of a plurality of separators of an oil processing facility.

15. A system, comprising:
    a separator, comprising:
        a vessel having a fluid inlet, a gas outlet, an oil outlet, and a water outlet, wherein the fluid inlet is configured to intake an oil-water mixture;
        an inlet separator section disposed in the vessel;
        an electrostatic separator section disposed in the vessel, wherein the electrostatic separator section comprises at least one electrode assembly comprising:
            a solid plate;
            a perforated plate spaced apart from the solid plate;
            a fluid flow path between the solid and perforated plates; and
            an electrode disposed along the fluid flow path, wherein the solid and perforated plates converge toward one another along the fluid flow path, the electrode is centered between the solid and perforated plates, and the electrode is configured to generate an electrostatic field to induce separation of water from the oil-water mixture; and
        a gravity separator section disposed in the vessel.

16. The system of claim 15, wherein the inlet separator section is disposed upstream from the electrostatic separator section, and the gravity separator section is disposed downstream from the electrostatic separator section.

17. A method, comprising:
    directing an oil-water mixture through an inlet separator section in a vessel of a separator, wherein the vessel comprises a fluid inlet to intake the oil-water mixture, a gas outlet, an oil outlet, and a water outlet;
    directing the oil-water mixture through an electrostatic separator section disposed in the vessel, wherein the electrostatic separator section comprises at least one electrode assembly comprising:
        a solid plate;
        a perforated plate spaced apart from the solid plate;
        a fluid flow path between the solid and perforated plates; and
        an electrode disposed along the fluid flow path, wherein the solid and perforated plates converge toward one another along the fluid flow path, the electrode is centered between the solid and perforated plates, and the electrode is configured to generate an electrostatic field to induce separation of water from the oil-water mixture; and
    directing the oil-water mixture through a gravity separator section disposed in the vessel.

18. The method of claim 17, wherein the inlet separator section is disposed upstream from the electrostatic separator section, and the gravity separator section is disposed downstream from the electrostatic separator section.

* * * * *